(12) United States Patent
Friedrich

(10) Patent No.: US 8,284,030 B2
(45) Date of Patent: Oct. 9, 2012

(54) METHOD AND DEVICE FOR RECOGNIZING FUNCTIONAL STATES IN RFID OR REMOTE SENSOR SYSTEMS

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 11 days.

(21) Appl. No.: 13/046,591

(22) Filed: Mar. 11, 2011

(65) Prior Publication Data

US 2011/0156876 A1  Jun. 30, 2011

Related U.S. Application Data

(63) Continuation of application No. 11/580,847, filed on Oct. 16, 2006, now abandoned, which is a continuation of application No. PCT/EP2005/003800, filed on Apr. 12, 2005.

(30) Foreign Application Priority Data

Apr. 14, 2004  (DE) .......................... 10 2004 018 558

(51) Int. Cl.
*H04Q 5/22* (2006.01)
*G08B 13/14* (2006.01)

(52) U.S. Cl. ................... 340/10.1; 340/10.41; 340/10.5; 340/5.61; 340/572.7

(58) Field of Classification Search ................. 340/10.1, 340/10.2–10.5, 572.7, 5.61; 370/389, 528, 370/522; 455/603; 375/219
See application file for complete search history.

(56) References Cited

U.S. PATENT DOCUMENTS

| | | | |
|---|---|---|---|
| 5,359,323 A | 10/1994 | Michel | |
| 5,818,348 A | 10/1998 | Walczak | |
| 6,712,276 B1 | 3/2004 | Abali | |
| 6,720,866 B1 | 4/2004 | Sorrels | |
| 6,784,813 B2 | 8/2004 | Shanks | |
| 7,193,504 B2 * | 3/2007 | Carrender et al. | 340/10.4 |
| 7,554,977 B2 | 6/2009 | Parizhsky | |

(Continued)

FOREIGN PATENT DOCUMENTS

DE  101 01 918  7/2002

(Continued)

OTHER PUBLICATIONS

ISO/IEG 18000-6 WD Mode 3, "Parameters for Air Interface Communications at 860 to 930 MHz," pp. 1-125, Feb. 1, 2002.

(Continued)

*Primary Examiner* — Nam V Nguyen
(74) *Attorney, Agent, or Firm* — Baker Botts L.L.P.

(57) ABSTRACT

A method for recognizing time-variable functional states, e.g., in the course of a programming process, in RFID systems is disclosed, which includes at least one transponder or remote sensor and at least one base station, which transmits data and/or power to the transponder or sensor by a carrier signal. According to the invention, after a specified process state is attained at least one confirmation symbol is transmitted by the transponder or sensor to the base station. As a result, no unfavorable "worst case" scenario has to be provided for chronologically controlling time-variable processes because the base station is able to clearly recognize the beginning and end of the process, as well as the state thereof. RFID systems or remote sensor systems can thus be controlled more quickly and more reliably, resulting especially in reduced costs.

20 Claims, 3 Drawing Sheets

U.S. PATENT DOCUMENTS

| | | | |
|---|---|---|---|
| 7,609,147 B2 * | 10/2009 | Friedrich | 340/10.3 |
| 7,893,815 B2 * | 2/2011 | Friedrich | 340/10.2 |
| 2002/0044595 A1 | 4/2002 | Friedrich | |
| 2002/0094830 A1 | 7/2002 | Wenzel | |
| 2003/0133435 A1 | 7/2003 | Friedrich | |
| 2005/0122651 A1 | 6/2005 | Fischer | |
| 2005/0206552 A1 | 9/2005 | Friedrich | |

FOREIGN PATENT DOCUMENTS

| | | |
|---|---|---|
| DE | 101 38 217 A1 | 3/2003 |
| DE | 103 56 259 A1 | 7/2005 |
| DE | 10 2004 013 156 | 10/2005 |
| GB | 2 308 947 | 7/1997 |
| GB | 2 390 508 | 1/2004 |

OTHER PUBLICATIONS

"Extending RFIDs Reach in Europe," Atmel Unveils Low-Power UHF Chip, *RFID Journal*, pp. 1-2, Mar. 10, 2002.

Finkenzeller, Klaus, "RFID Handbook," Fundamentals and Applications in Contactless Smart Cards and Identification, 2nd Edition (equivalent of German version, 3 Edition); p. 44, 2003.

* cited by examiner

METHOD AND DEVICE FOR RECOGNIZING FUNCTIONAL STATES IN RFID OR REMOTE SENSOR SYSTEMS

This application is a continuation, under 35 U.S.C. §120, of U.S. patent application Ser. No. 11/580,847, filed 16 Oct. 2006, now abandoned, which is a continuation of International Patent Application No. PCT/EP05/03800, filed on 12 Apr. 2005, which claims the benefit of German Patent Application No. DE 102004018558, filed 14 Apr. 2004.

BACKGROUND OF THE INVENTION

1. Field of the Invention

The invention relates to a method for recognizing time-variable functional states in RFID systems with at least one transponder or remote sensor and at least one base station, which transmits data and/or power to the transponder or sensor by a carrier signal. Furthermore, the invention relates to a device on a transponder or remote sensor for time-variable, process-dependent control of a data transmission in RFID or remote sensor systems with at least one base station and at least one such transponder or sensor.

2. Description of the Background Art

In recent years, automatic identification methods, also called auto-ID, have been widely used in many service sectors, in acquisition and distribution logistics, in commerce, in production, and in material flow systems. The goal of auto-ID is the extensive provision of information on persons, animals, objects, and products.

An example of such auto-ID systems are the chip cards, commonly used today, in which a silicon memory chip by mechanical-galvanic contacting is provided with power, read out, and optionally also reprogrammed by a reader, the so-called base station. In this case, the acquisition device is routinely called the reader, regardless of whether it can only read or rewrite data.

RFID systems include two basic components, namely, the transponder or sensor in the case of a remote sensor system, i.e., an application-specific integrated circuit (IC) with a coupling element, such as a dipole antenna as the transmitting and receiving device, and the base station, which typically has a high-frequency module (transmitter-receiver) and a coupling element. Data are transmitted both from the base station to the transponder or sensor (forward link) and in the opposite direction (return link).

In RFID systems, the data carrier, the transponder or sensor, can be supplied with power not only through galvanic contacting but also contactless with use of electromagnetic fields within the radio frequency (RF). Transponders or sensors without any independent energy source are called "passive" transponders or sensors. Those with an (additional) independent energy supply, e.g., by a battery, are called "semi-passive" transponders or sensors.

Such RFID systems, whose range is considerably greater than 1 m, work with electromagnetic waves in the UHF and microwave range. In this case, a backscattering method, called the backscatter principle because of its physical operating mode, is used predominantly during the course of which a portion of the energy arriving at the transponder or sensor from the base station is reflected (backscattered; so-called backscattering) and in so doing is optionally modulated for data transmission: The IC receives via the coupling element a high-frequency carrier, designated hereafter also as the carrier signal, which it transmits by suitable modulation and backscattering devices partially back to the base station.

The transponders and sensors, named above as components of such a system, are also typically, as well as generalized hereafter, called tags.

For certain applications, the aforementioned tags have a writable memory, such as an EEPROM or the like, and are accordingly programmable by a suitable command from the base station. In this regard, in RFID applications, particularly during use of purely passive tags, it occurs routinely during programming that to achieve increased programming ranges for the purpose of assuring a sufficient power supply for an appropriate process duration, the allocated programming time (duration) must be lengthened. An appropriately designed RFID system must then reserve sufficient derivative time in the control case, which disadvantageously leads to lengthening of the communication. Furthermore, the programming time can be different also when different memory technologies are used. Furthermore, it can occur in sensor applications that a measured value is available only after a certain, variable time.

"Processes" will also be used as a general term hereafter instead of sequences of operations such as programming, a reading process, a measurement, or the like. A process state thereby is understood to be a quantitative and/or qualitative progression of the process, e.g., its ending, particularly in conjunction with an evaluation of the process result, such as "successfully completed" or "not successfully completed."

A prior-art approach to avoid the aforementioned disadvantage is the use of so-called autoincrement or autodecrement techniques. In this case, after completion of a process, such as programming, for example, by a short command (shortened compared with the process command), an additional data stream is transmitted from the base station to the tag, which is then immediately programmed, without an associated (memory) address being transmitted, because it was automatically changed (by autoincrement/autodecrement). Alternatively, the same datum is programmed in the next address (also by a suitable short command). In this case, it is to be regarded as particularly disadvantageous that after completion of such a process sequence, the entire memory must be read out to assure that all data were saved, which in turn represents a considerable additional time expenditure. Moreover, a transmission is then no longer possible in regard to quality of the programming (dwell time, data retention time).

In the Palomar protocol (cf. ISO submission ISO/IEC 18000-6 WD Mode3 of 1 Feb. 2002), information on the quality of the programming is transmitted in a status word after a programming process. This technique, however, disadvantageously requires that this status word is requested also in fact after completion of the programming.

The German patent application DE 103 56 259, which corresponds to U.S. Publication No. 20050122651, which is herein incorporated by reference, discloses a method by which a tag automatically adjusts the programming time to the conditions of the field or to a power source supplying it.

DE 101 38 217 A1, which corresponds to U.S. Publication No. 20030133435, which is herein incorporated by reference, relates to a method in which to transmit data by a header section in the data protocol, by which a number of symbols used for coding in the data field and their identification are defined, the data rate is adjusted to the communication conditions. In this case, the data rate can be substantially increased by reducing, for example, the number of symbols and/or simplifying their identification at a large communication distance.

Furthermore, it is known in conventional programming applications to again provide data for control after their programming. In this case, it is to be regarded as particularly disadvantageous that whether the data are now present can hardly be verified in this way; information on the retention time cannot be derived, however.

Another obvious solution to the aforementioned problem is to search for a load change signature in the "transmit signal" of the tag: If a purely passive tag is used, a load change affects the aforementioned transmit signal (backscatter signal) of the tag behind its routinely present rectifying means to generate a supply DC voltage from the alternating field power transmitted by the base station. After this change, the base station can search by observing its incoming signal. In this case, however, it is to be regarded as particularly disadvantageous that, on the one hand, in a noisy environment a single load change is not received reliably and that, on the other, in semi-passive tags a load change does not affect the backscatter, because the power supply of the tag does not come from the field by definition. For this reason, this type of detection cannot be used particularly in mixed systems, i.e., systems supporting both passive and semi-passive tags.

If, moreover, a time-variable process is integrated into the system, e.g., computational determination of a certain parameter, measurement of a physical parameter in the sensor applications, or the like, which routinely only has little effect on load behavior and thus on backscatter, recognition of the process state is also not possible in the manner described above.

GB 2 308 947 A, GB 2 390 508 A, U.S. Pat. Nos. 6,720,866 B1, and 6,712,276 B1 are directed to methods and devices, whereby sensor data is transmitted from a transponder to a base station.

SUMMARY OF THE INVENTION

It is therefore an object of the present invention to provide for monitoring time-variable processes in RFID or remote sensor systems, which avoid at least the disadvantages presented above.

The method according to an embodiment provides for recognizing a state of a programming process within a transponder or remote sensor in RFID systems with the at least one transponder or remote sensor and at least one base station, which transmits data and/or power to the transponder or sensor by means of a carrier signal, whereby the programming process is initiated by sending a signal via the base station, and after a specified state of the programming process is attained, at least one confirmation symbol that is asynchronous to the signal of the base station is transmitted by the transponder or sensor to the base station.

Due to the asynchronous transmittance of the confirmation symbol, a time-optimal flexible indication of a process state is possible, while at the same time, by foregoing synchronization tags (so-called notch signals, modulation dips) transmitted by the base station, interferences with parallel communication processes are avoided.

Furthermore, to attain the aforementioned object, the invention creates a device on a transponder or remote sensor for time-variable, process-dependent control of a data transmission in RFID or remote sensor systems with at least one base station and at least one transponder or sensor, comprising: an oscillator to generate an oscillator signal at a first frequency; a frequency divider to generate a confirmation signal at least one second frequency from the oscillator signal; and a modulator to generate a confirmation symbol to be transmitted to the base station depending on a state of a programming process within the transponder or remote sensor, whereby the programming process is initiated by sending a signal via the base station, and the confirmation symbol is transmitted asynchronous to the signal. The aforementioned frequency divider, however, according to the invention, needs to be present only if an auxiliary carrier is to be output for transmitting the confirmation symbol (see below).

With the use of the method of the invention, particularly with the use of a device according to the invention, the base station can promptly recognize the state of a particular process, without having to resort to inflexible and routinely time-unfavorable presettings.

According to an embodiment of the method of the invention, which is used particularly in low-frequency systems, e.g., in the range of 125 kHz or 13.56 MHz, it is provided that a frequency of the carrier signal is divided to generate an auxiliary carrier and this is used as the confirmation symbol, as has already been discussed above. Alternatively, for this purpose, an internal oscillator frequency of the transponder or sensor is divided to generate an auxiliary carrier and this is used as the confirmation symbol.

An "auxiliary carrier" is understood hereafter, according to the usage in radio technology, to be an additionally introduced clock frequency $f_H$, with which, for example, during a transmission, based on load modulation of a carrier signal, from the tag to the base station an additional load resistor for the purpose of modulation in the tag is turned on and off. As a result, two spectral lines arise at a distance of $\pm f_H$ around the transmitting frequency $f_s$ (of the carrier signal) of the base station (see Finkenzeller, RFID-Handbook, 3rd edition (2002), Hanser, pp. 44ff).

According to another embodiment, depending on the state of the programming process, an auxiliary carrier, predefined in each case, is transmitted as a confirmation symbol. If, for example, programming of the tag was successful and a specific data retention time can be assured, an auxiliary carrier of a first frequency $f_{H1}$ is used; if the retention time cannot be guaranteed, a second frequency $f_{H2}$ is used. In this way, the base station always receives a clear signal on the basis of which it can initiate predefined additional process steps. Another further embodiment of the device of the invention includes a modulation control unit functionally connected to the frequency divider to control the frequency of the confirmation signal, whereby an operating mode and/or frequency of the oscillator or oscillator signal can be controlled depending on the time-variable process states.

In a further embodiment of the method of the invention, it can be provided that a divider ratio of the carrier signal and the confirmation signal is derived from a symbol of a return link header transmitted between the base station and the transponder or sensor. Thus, it can be assured in a simple way that the auxiliary carrier is within a certain frequency range at all times to be able to be picked up in particular by suitable receiving devices of the base station. According to a further embodiment of the method of the invention, a definition, contained in the return link header, of a logic "0" symbol or a logic "1" symbol is thereby used to derive the divider ratio (provided an auxiliary carrier is to be output) or directly to generate the confirmation symbol. In latter case, a logic "0" stands for a failed process performance; "1" means that the process was successfully completed.

Alternatively, a coding reference symbol, contained in the return link header (cf., e.g., ISO 18000-8 WD Mode3 of 1 Feb. 2002), can be used to derive the divider ratio. According to another variant, a pulse-pause ratio for the transmission of the confirmation symbol can be derived from a symbol of the return link header transmitted between the base station and the transponder or sensor, for example, a ratio of 25% to 75% of a time duration of the corresponding symbol for transmitting a logic "0" and a ratio of 50% to 50% for a logic "1."

The transmission of the confirmation symbol can end after a predefined number of transmission processes, e.g., after 8 or 16 transmission processes. In this way, it is possible to recognize whether, when several tags are present in the field, all of these tags have ended the process execution or the transmission of the confirmation symbol.

To improve the signal-to-noise ratio further, during derivation of the auxiliary carrier frequency from the aforementioned header, the transmission of the confirmation symbol according to the invention can occur under base station control, within a frequency domain with a low noise power. For this purpose, the device of the invention can include a memory for storing the time step signal, received by the base station, to establish the frequency of the confirmation symbol.

A predefined time step can continue to be counted repeatedly in the transponder or sensor to synchronize the transmission of the confirmation symbol, whereby the time step is preferably combined within a forward link between the base station and the transponder or sensor.

In a further embodiment, a device of the invention accordingly has a counter for continued counting of the time step to synchronize transmission of the confirmation symbol.

If the continued counting also occurs with a constant field, i.e., if no data transmission to the tag occurs, it is possible to achieve a substantially synchronous transmission of the confirmation signal when several tags are present in the field of the base station. The signal-to-noise ratio can be further improved in this way. To that end, it is further provided according to the invention that the transmission of the confirmation symbol after a time n×m×R1 occurs after the provision (transmission and storage) of the time step, whereby n∈N, n>0, R1 designates the time step, and the value of m depends on a stipulated coding of the confirmation symbol, e.g., m∈{¼, ½, 1}.

Furthermore, a device according to the invention in an embodiment preferably has a switch, such as a multiplexer, for switching between a data modulation stream and a confirmation modulation stream of the transponder or sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
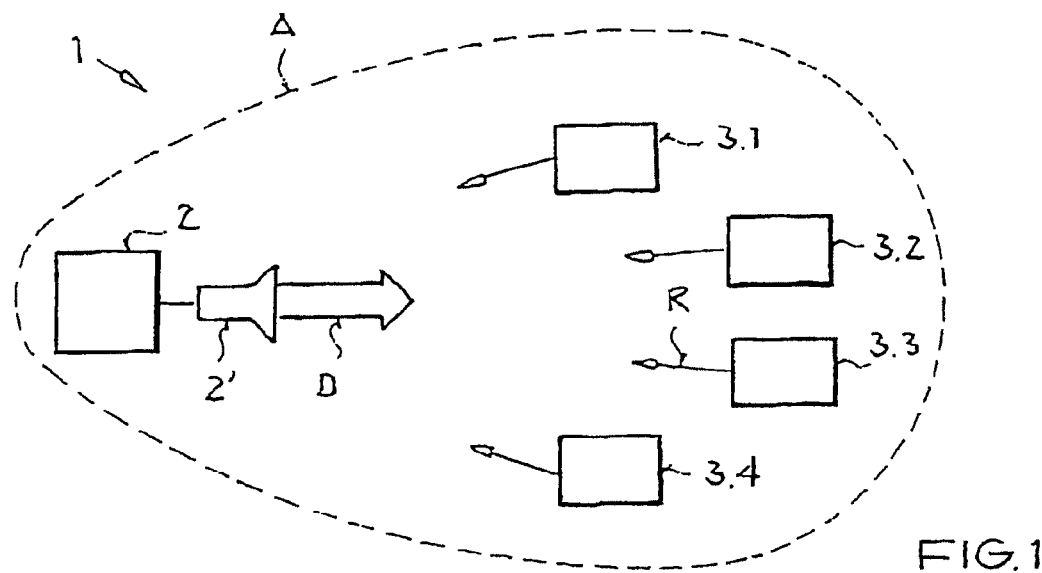
FIG. 1 shows schematically an RFID system with a reader and a number of tags (transponders or remote sensors) within the response range of the reader.

FIG. 1 shows an RFID system 1 with a reader 2 in conjunction with a suitable sending and receiving device 2', such as a dipole antenna, and a number of transponders 3.1-3.4, which together are located within a response range A of reader 2.

A data stream D transmitted by reader 2 or sending device 2' is received substantially simultaneously by all transponders 3.1-3.4. The data transmission from reader 2 to a transponder 3.1-3.4 is described below as a forward link. The transponders 3.1-3.4 respond at least to a completed data transmission from reader 2 via the return links R (return link), whereby some of the energy coming in from reader 2 together with the data D at transponder 3.1-3.4 is reflected (backscattered) and thereby is optionally modulated for data transmission from transponder 3.1-3.4 to reader 2. During use of a full duplex-capable system 1 (simultaneous transmission in the forward and return link), a data transmission to reader 2 can also occur even during the forward link.

Although here and below, sometimes only transponders are discussed, the present invention can of course also be used in systems with a number of remote sensors, optionally also in conjunction with a number of transponders.

Figure 2:
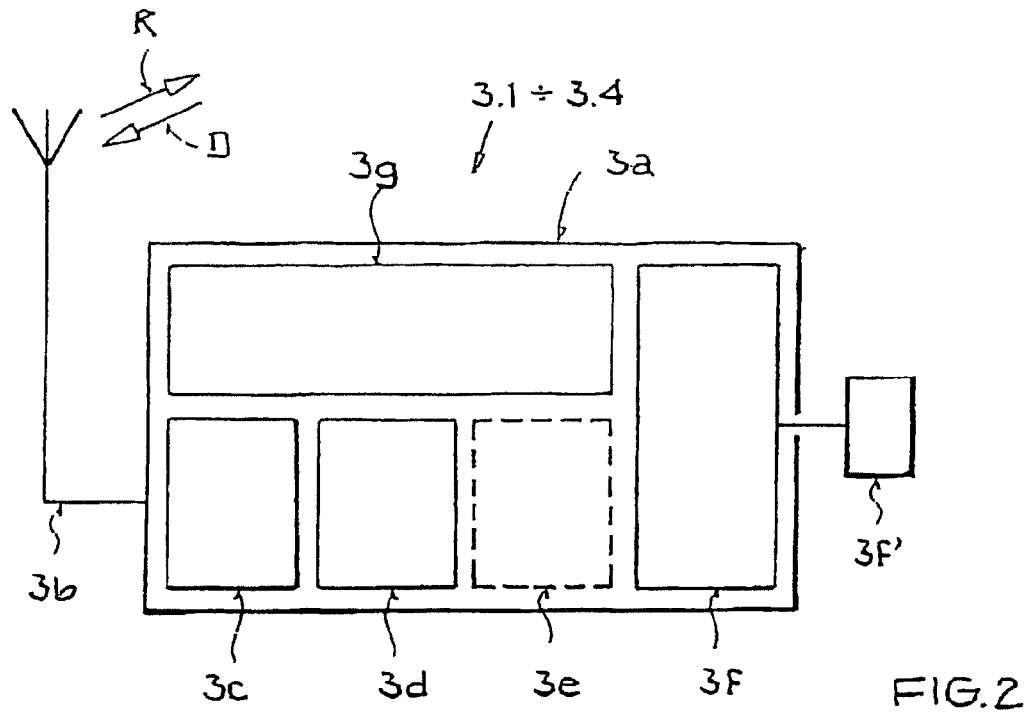
FIG. 2 is a block diagram of a tag according to FIG. 1.

FIG. 2 shows schematically with use of a block diagram a transponder 3.1-3.4 of the RFID system 1 of FIG. 1, here in an embodiment as a remote sensor. The transponder/sensor 3.1-3.4 accordingly has at least one integrated circuit (IC) 3a and a (dipole) antenna 3b as the only external wiring for transmitting and receiving data D, R including commands or control signals (e.g., modulation dips or notch signals) and optionally power. Furthermore, the transponder/sensor 3.1-3.4 according to FIG. 2 has a memory 3c, such as an EEPROM, particularly for storage of the data received by the base station, and a counter 3d for continued internal counting of time steps (see below). Optionally, furthermore, additional a power supply 3e is present, such as a battery, when this is a semi-passive transponder/sensor 3.1-3.4, which is indicated by the broken lines in FIG. 2.

In functional connection with a process control/computing device 3f, the transponder/sensor 3.1-3.4, furthermore, has a sensor 3f', for example, for measuring ambient temperature, pressure, etc. The process control/computing device 3f serves the transponder/sensor 3.1-3.4 as a type of state machine to perform logic operations, and has the additional capacity of storing variable states. In the indicated exemplary embodiment, thus measured values supplied by the sensor 3f' can be processed, converted, stored, and optionally evaluated. Therefore, if the measuring process performed with the aid of sensor 3f', due to the variable measuring duration possibly depending on the ambient parameters, is regarded as a time-variable process running in transponder/sensor 3.1-3.4, which can be initiated particularly by a suitable command transmitted by the base station, thus information on an (instantaneous, time-dependent) stage of this process can be obtained by the process control/computing device 3f (state machine). Such information can relate to the course of the measuring process (completed/not completed) or a received or calculated result (result meaningful/faulty).

Another example, already discussed above, of a time-variable process running in the transponder 3.1-3.4, which can be monitored by the process control/computing device 3f, can be a programming process, for example, in memory 3c. The time requirement for a successful programming is thereby a function of several time-variable factors, such as field strength and field stability, the size and location of memory 3c, guaranteed data retention time, etc. The programming process can be completed successfully as a function of these factors, with a simultaneously sufficient retention time for the program data, or unsuccessfully (e.g., due to insufficient retention time).

Figure 3:
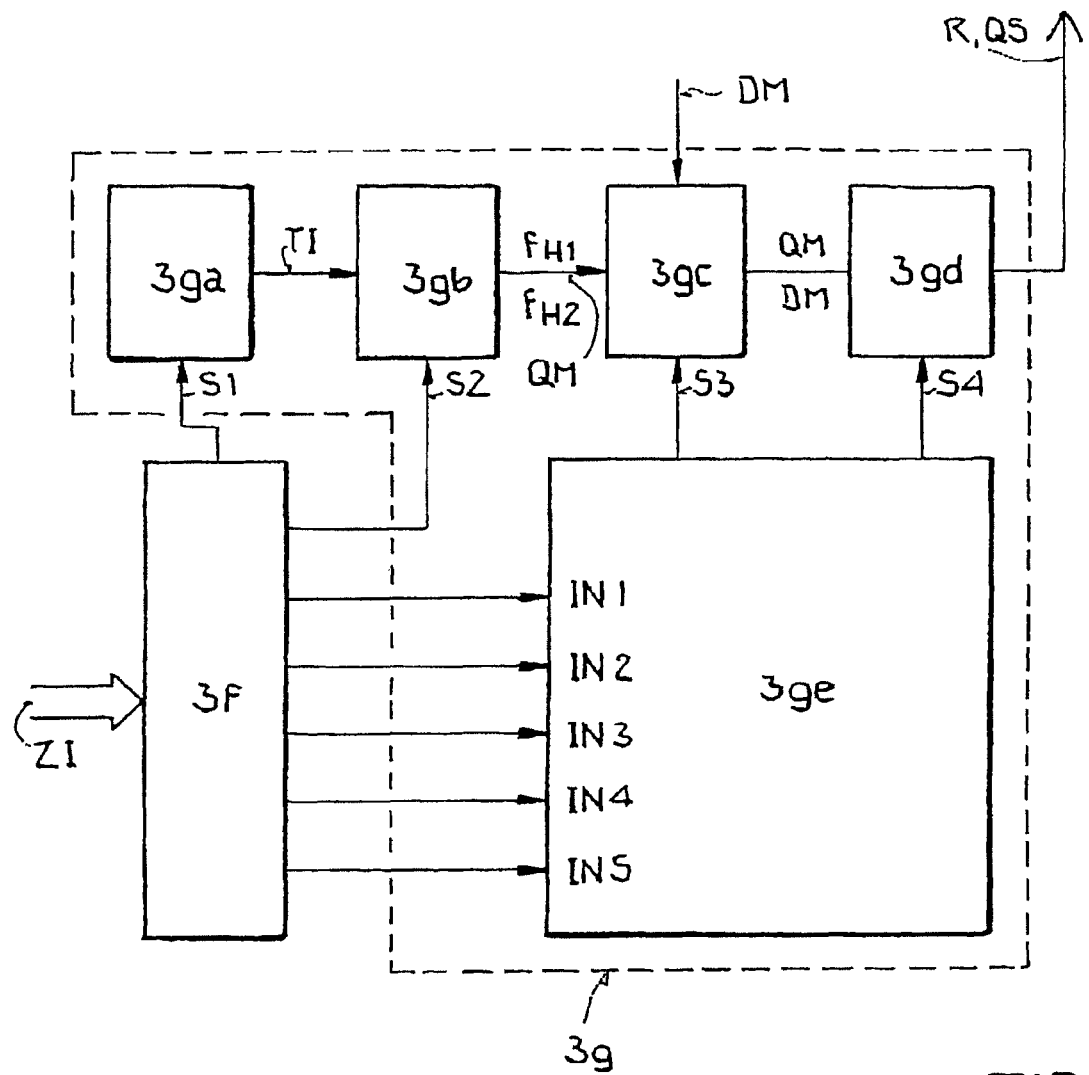
FIG. 3 is a block diagram of a modulation control unit of FIG. 2.

The transponder/sensor 3.1-3.4 in the shown embodiment also has a modulation control unit 3g, which is described in greater detail hereafter with use of FIG. 3.

FIG. 3 shows in detail the modulation control unit 3g of FIG. 2 in functional connection with the process control/computing device 3f already discussed above, the state machine. Accordingly, the modulation control unit 3g (at least in high-frequency applications; see above) first has an internal oscillator 3ga, which, for example, can be made as an RC oscillator and whose frequency or operating state (on/off) can be controlled by the state machine 3f (arrow S1 in FIG. 3). Furthermore, there is a frequency divider 3gb functionally connected, on the one hand, to oscillator 3ga and, on the other, to a multiplexer 3gc. The frequency divider 3gb can also be controlled by another control signal S2 by state machine 3f.

The multiplexer 3gc, according to the drawing in FIG. 3, has at least one more input for a data modulation stream DM of the data to be transmitted by the transponder/sensor to the base station.

Downstream to the multiplexer 3gc, the modulation control unit 3g of the invention has a modulator 3gd, which is designed for modulating a carrier signal (not shown) of the base station for the purpose of transmitting data by the transponder/sensor 3.1-3.4 (FIG. 2) via the return link R to base station 2. In this case, all common types of modulation can be used, for example, by changing the real and/or imaginary part of the input impedance of the tag. The change of the real part corresponds to a load modulation (also: ASK; amplitude shift keying); the change of the imaginary part causes a phase modulation (PSK; phase shift keying). In practice, these types of modulation are used in combination. Finally, the modulation control unit has a control device 3ge functionally connected to the state machine 3f, which in turn is set up to control the multiplexer 3gc (control signal S3) and modulator 3gd (control signal S4).

The oscillator 3ga, according to FIG. 3, provides clock information TI at a first frequency, which according to the shown embodiment is supplied to frequency divider 3gb. According to the invention, an auxiliary carrier frequency $f_{H1}$, $f_{H2}$ (see above) is available as the confirmation signal at the output of the divider; it is controlled by the state machine 3f (control signal S2) from the state information ZI of the time-variable process and thus represents a confirmation modulation stream QM for modulation of the carrier signal by modulator 3gd. The multiplexer 3gc, as taught by the invention, in accordance with the control device 3ge (control signal S3) switches between the data modulation stream DM and the confirmation modulation stream QM and via control signal S4 optionally releases the appropriate modulation by modulator 3gd, to indicate to the base station the process state of the tag by transmitting an appropriate confirmation symbol QS. To this end, the control device 3ge in the shown embodiment of state machine 3f receives input signals IN1-IN5, with the assignment:

IN1 time-variable process (programming, measuring process, . . . ) completed;
IN2 time-variable process successfully completed (sufficient retention time, reliable measuring result, . . . );
IN3 time-variable process not completed successfully;
IN4 data modulation released;
IN5 confirmation modulation released.

In simpler versions, not shown here, of the device of the invention, the signals IN2, IN3 can be omitted. The actual course of the control (start of the process or of the confirmation; also cf. FIG. 5) can occur in state machine 3f.

Figure 4:
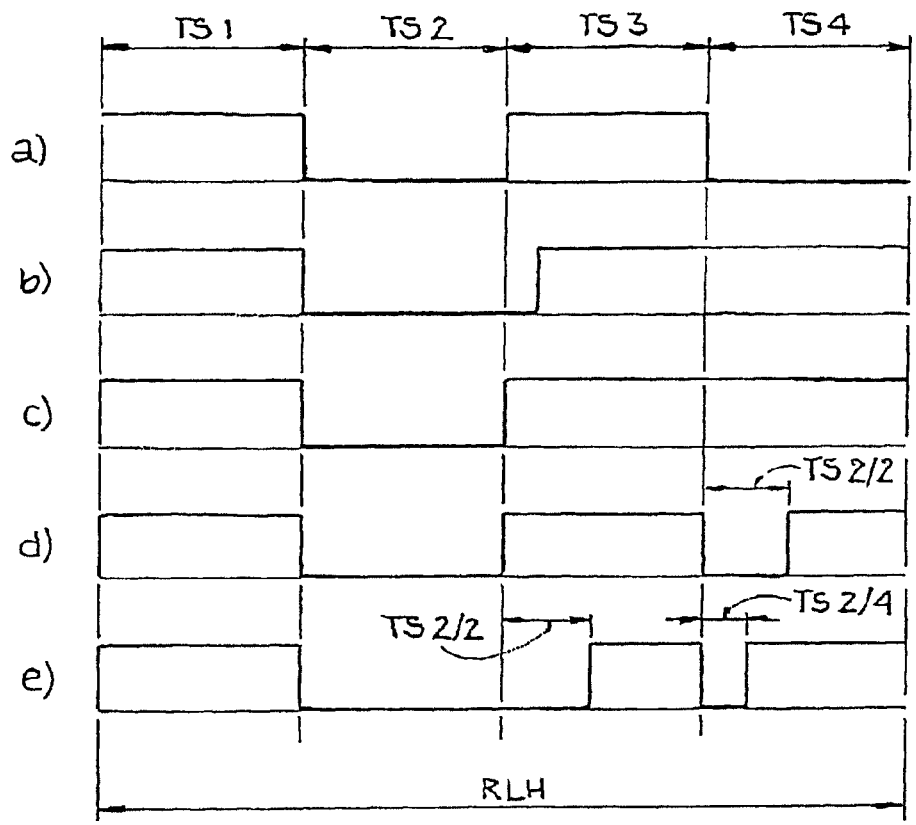
FIG. 4 is a schematic drawing of return link headers transmitted by the base station.

FIG. 4 illustrates how according to the invention the return link header RLH, transmitted by the base station, is used to establish the divider ratio, used in the frequency divider 3gb, to generate the frequencies $f_{H1}$, $f_{H2}$ from the internal oscillator frequency, in order to assure in this way that the auxiliary carrier is always within a certain frequency domain. With the return link header RLH, the base station according to the German Patent Application DE 10 2004 013156, which corresponds to U.S. Publication No. 20052006552, which is incorporated by reference herein, transmits modulation references and additional control symbols, for example, for anti-collision routines.

FIG. 4 shows in a) the header signal to be transmitted (level2send) with four subsymbols TS1-TS4, which contains particularly as the second subsymbol TS2 a time reference for the data stream modulation in the return link R from the tag to the base station. Shown below this is the corresponding modulated signal in various types of modulation:

b) NRZI coding (Non-Return-to-Zero-Inverted: Logic "1" corresponds to a change in the modulation state and "0" to no change);
c) soft NRZI coding (NRZI coding with a time-displaced edge change);
d) FM0 coding ("0" corresponds to an arbitrary edge in the middle of a bit interval of the length TS2 and "1" to an edge at the end of an interval); and
e) 3phase1 coding (significant value of a character depending on the time interval to a synchronization mark (notch) of the base station; here: "1" corresponds to a distance TS2/2 and "0" corresponds to TS2/4).

The time reference from the header RLH is now used to derive the auxiliary carrier frequency for the confirmation symbol QS to be transmitted to the base station (FIG. 3). This can occur either directly from the subsymbol TS2, or depending on the coding stipulation, from a logic "1" or "0" symbol, as described above. Furthermore, the subsymbol TS2 can be used with an appropriate selection to establish a pulse-pause ratio for the auxiliary carrier.

Figure 5:
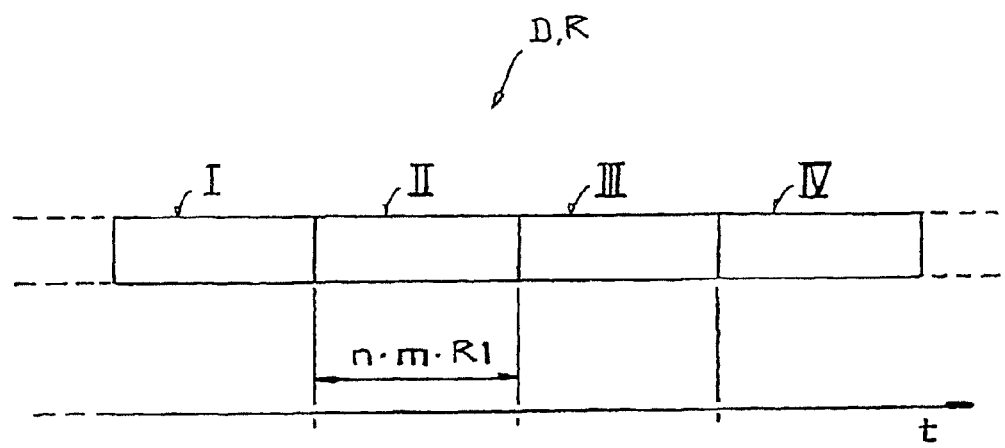
FIG. 5 is a flow chart of a time-variable programming.

To improve the signal-to-noise ratio of the confirmation transmission, according to the invention, the process proceeds preferably further as shown in FIG. 5:

FIG. 5 shows the time course of a time-variable process proceeding in a transponder, e.g., programming. First, during a first time period I a data stream D with data and time references (e.g., TS2; cf. FIG. 4) is received by the transponder. One of these time references (here: the subsymbol TS2 according to FIG. 4) is stored as time step reference R1 in the transponder, e.g., in memory 3c (FIG. 2). Next, the programming occurs during time period II, whereby time step R1 continues to be counted by counter 3d, also when the base station transmits a constant field (i.e., no information transmission to the transponder occurs). Because, as already stated, the programming processes or the like are time-variable processes, according to the invention the programming process (section II) is followed by a confirmation section during the subsequent time period III. The confirmation, i.e., the release of the appropriate modulation by control device 3ge (FIG. 3) for the transmission of the confirmation symbol QS, occurs after a time n×m×R1 after provision (receipt, storage) of time step R1, whereby n∈N, n>0. The value of m depends on a stipulated coding of the confirmation symbol QS, e.g., m∈{¼, ½, 1}, whereby the values provided by way of example according to the above statements for FIG. 4 stand for a 3phase1 coding (subdrawing e) in FIG. 4), an FM0 coding (d), or a (hard) NRZI coding(c), when at the same time a reference for the baud rate in the case of asynchronous transmission is the same as the time reference for the edge control.

In this way, the transmission of the confirmation symbol QS begins in the presence of several transponders 3.1-3.4 in the field of a base station 2 (FIG. 1) substantially (grid) synchronously, so that an improved signal-to-noise ratio results.

After the received confirmation by the base station, the transponder receives time-variable further commands (data) during time period IV.

Thus, in time-variable processes, for the time control no unfavorable "worst case" scenario must be provided, because the base station is able to clearly recognize the beginning and end of the process and its state. The control of RFID or remote sensor systems is rapid and reliable, resulting in reduced costs. The thus practiced reading out of data after a programming can be omitted, because the data integrity was routinely assured by an evaluation of protection characters, e.g., a CRC evaluation: If the data stream is transmitted from the base station to a tag, the base station also supplies the protection characters, which are also programmed when no errors are indicated. Therefore, it is sufficient in most cases to know that the programming has occurred properly. The use of a sub-symbol definition from the header enables a simple bandwidth control. In a beginning confirmation, a favorable signal-to-noise ratio is obtained after a consistent time n×m×R1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A method comprising:
   receiving from a base station a data transmission comprising a carrier signal having a time reference;
   initiating, in response to receiving the time reference of the data transmission, a programming process of a memory of a transponder, the programming process programming the memory of the transponder according to the data transmission; and
   transmitting, based on a state of the programming process of the memory of the transponder, a confirmation symbol to the base station.

2. The method of claim 1, further comprising dividing a frequency of the carrier signal to generate the confirmation symbol as an auxiliary carrier signal.

3. The method of claim 2, wherein transmitting a confirmation symbol comprises transmitting the auxiliary carrier signal on one of a frequency selected based on the state of the programming process.

4. The method of claim 1, further comprising determining a divider ratio of the carrier signal and the confirmation signal based on a symbol of a return link header received from the base station.

5. The method of claim 1, further comprising switching between a data modulation stream and a confirmation modulation stream based on the state of the programming process of the memory.

6. The method of claim 1, further comprising receiving additional data initiating additional steps of the programming process of the memory.

7. The method of claim 1, wherein a confirmation modulation stream comprises state information of the programming process of the memory.

8. A circuit configured to:
   receive from a base station a data transmission comprising a carrier signal having a time reference;
   initiate a programming process of a memory of a transponder in response to receiving the time reference of the data transmission, the programming process programming the memory of the transponder according to the data transmission; and
   transmit a confirmation symbol to the base station based on a state of the programming process of the memory of the transponder.

9. The circuit of claim 8, further configured to divide a frequency of the carrier signal to generate the confirmation symbol as an auxiliary carrier signal.

10. The circuit of claim 9, further configured to transmit the auxiliary carrier signal on one of a first or second frequency based on the state of the programming process.

11. The circuit of claim 8, further configured to determine a divider ratio of the carrier signal and the confirmation signal based on a symbol of a return link header received from the base station.

12. The circuit of claim 8, further configured to switch between a data modulation stream and a confirmation modulation stream based on the state of the programming process of the memory.

13. The circuit of claim 8, further configured to receive additional data initiating additional steps of the programming process of the memory.

14. An apparatus comprising:
   an antenna configured to receive from a base station a data transmission comprising a carrier signal having a time reference;
   a state machine configured to initiate, in response to receiving the time reference of the data transmission, a programming process of a memory of a transponder, the programming process programming the memory of the transponder according to the data transmission; and
   a modulation-control unit configured to transmit, based on a state of the programming process of the memory of the transponder, a confirmation symbol to the base station.

15. The apparatus of claim 14, wherein the modulation control unit further comprises a frequency divider configured to divide a frequency of the carrier signal to generate the confirmation symbol as an auxiliary carrier signal.

16. The apparatus of claim 15, wherein the modulation control unit is further configured to transmit the auxiliary carrier signal on one of a frequency selected based on the state of the programming process.

17. The apparatus of claim 14, wherein the state machine is further configured to determine a divider ratio of the carrier signal and the confirmation signal based on a symbol of a return link header received from the base station.

18. The apparatus of claim 14, wherein the modulation control unit further comprises a multiplexer configured to switch between a data modulation stream and a confirmation modulation stream based on the state of the programming process of the memory.

19. The apparatus of claim 14, wherein the state machine is further configured to receive additional data initiating additional steps of the programming process of the memory.

20. The apparatus of claim 14, wherein a confirmation modulation stream comprises state information of the programming process of the memory.

* * * * *